(12) United States Patent
Ito (10) Patent No.: US 8,245,149 B2
(45) Date of Patent: Aug. 14, 2012

(54) ASSOCIATING AN OBJECT WITH A PRINT DRIVER ON A DISPLAY

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1144 days.

(21) Appl. No.: 11/777,485

(22) Filed: Jul. 13, 2007

(65) Prior Publication Data

US 2008/0024818 A1    Jan. 31, 2008

(30) Foreign Application Priority Data

Jul. 25, 2006  (JP) .................................. 2006-201858
May 18, 2007  (JP) .................................. 2007-133338

(51) Int. Cl.
*G06F 3/048* (2006.01)
*G06F 3/12* (2006.01)

(52) U.S. Cl. ...................................... 715/769; 358/1.15

(58) Field of Classification Search .................... 715/764, 715/769; 358/1.15
See application file for complete search history.

(56) References Cited

U.S. PATENT DOCUMENTS

| | | | |
|---|---|---|---|
| 6,268,924 B1 | 7/2001 | Koppolu et al. | |
| 6,542,892 B1 * | 4/2003 | Cantwell ............................ | 1/1 |
| 7,557,827 B2 | 7/2009 | Ishiyama et al. | |
| 7,606,938 B2 * | 10/2009 | Roese et al. ............... | 455/456.1 |
| 2002/0122199 A1 * | 9/2002 | Lomas et al. ................ | 358/1.14 |
| 2004/0189811 A1 | 9/2004 | Ishiyama et al. | |
| 2004/0203358 A1 | 10/2004 | Anderson et al. | |
| 2007/0264991 A1 * | 11/2007 | Jones et al. ................. | 455/420 |
| 2010/0077336 A1 * | 3/2010 | Ording et al. ............... | 715/769 |

FOREIGN PATENT DOCUMENTS

| | | |
|---|---|---|
| JP | 2003-131827 A | 5/2003 |
| JP | 2003-134127 | 5/2003 |
| JP | 2004-179872 A | 6/2004 |
| JP | 2004-280835 A | 10/2004 |
| JP | 2004-284318 A | 10/2004 |
| JP | 2006-050587 A | 2/2006 |

OTHER PUBLICATIONS

Machine translation of JP 2003-134127 to Fukushima et al.*
Office Action, dated Oct. 31, 2008, in CN 200710136707.5.

* cited by examiner

*Primary Examiner* — Benny Q Tieu
*Assistant Examiner* — Eric A Rust
(74) *Attorney, Agent, or Firm* — Fitzpatrick, Cella, Harper & Scinto (57) ABSTRACT

The convenience for a user can be improved when a printer apparatus is used through an information processing apparatus. The information processing apparatus includes: an associating unit for associating an object with a printer driver corresponding to a printer apparatus and a network port relating to a communication with the printer apparatus when the communication with the printer apparatus is established, and releasing the association between the object and the printer driver corresponding to the printer apparatus and the network port relating to the communication with the printer apparatus when the communication with the printer apparatus is not established; and an object control unit for performing control to display on a display apparatus a first object associated by the associating unit with a printer driver corresponding to a first printer apparatus and a network port relating to a communication with the first printer apparatus, and a second object associated with a printer driver corresponding to a second printer apparatus different from the first printer apparatus and a network port relating to a communication with the second printer apparatus as the same object.

9 Claims, 10 Drawing Sheets

ASSOCIATING AN OBJECT WITH A PRINT DRIVER ON A DISPLAY

BACKGROUND OF THE INVENTION

1. Field of the Invention

The present invention relates to an information processing apparatus and an information processing method for performing a job on a printer apparatus.

2. Description of the Related Art

Recently, various communication systems are established and enacted. In this situation, there are an increasing number of information equipment units using communications and there also are growing number of scenes and user needs for communications.

Under the circumstances, if there are information equipment units close to each other such that the units can communicate with each other by wireless, there is a system for displaying an icon indicating each information equipment unit on the display device of the information equipment unit (for example, refer to Japanese Patent Application Laid-open No. 2003-134127).

When a PC and a printer establish a communication path to display an icon of the printer on the display device of the PC, it is necessary for a user to manually retrieve and specify the printer to be used. In this case, if the technique of Japanese Patent Application Laid-open No. 2003-134127 is used, the number of icons displayed is equal to the number of the printers close to each other such that the PC can communicate with the printers by wireless, thereby causing inconvenience for the user.

SUMMARY OF THE INVENTION

The present invention aims at improving the convenience of a user when a printer apparatus is used through an information processing apparatus.

In addition, the present invention also aims at preventing the number of displayed objects corresponding to printer apparatuses from increasing without limit and protecting a user from entering a confused state when a portable communication apparatus is connected to various printer apparatuses.

Therefore, the information processing apparatus according to the present invention includes: an associating unit configured to associate an object with a printer driver corresponding to a printer apparatus and a network port relating to a communication with the printer apparatus when the communication with the printer apparatus is established, and to release the association between the object and the printer driver corresponding to the printer apparatus and the network port relating to the communication with the printer apparatus when the communication with the printer apparatus is not established; and an object control unit configured to perform control to display on a display apparatus a first object associated by the associating unit with a printer driver corresponding to a first printer apparatus and a network port relating to a communication with the first printer apparatus, and a second object associated with a printer driver corresponding to a second printer apparatus different from the first printer apparatus and a network port relating to a communication with the second printer apparatus as a same object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The embodiments of the present invention are described below with reference to the attached drawings.

Figure 1:
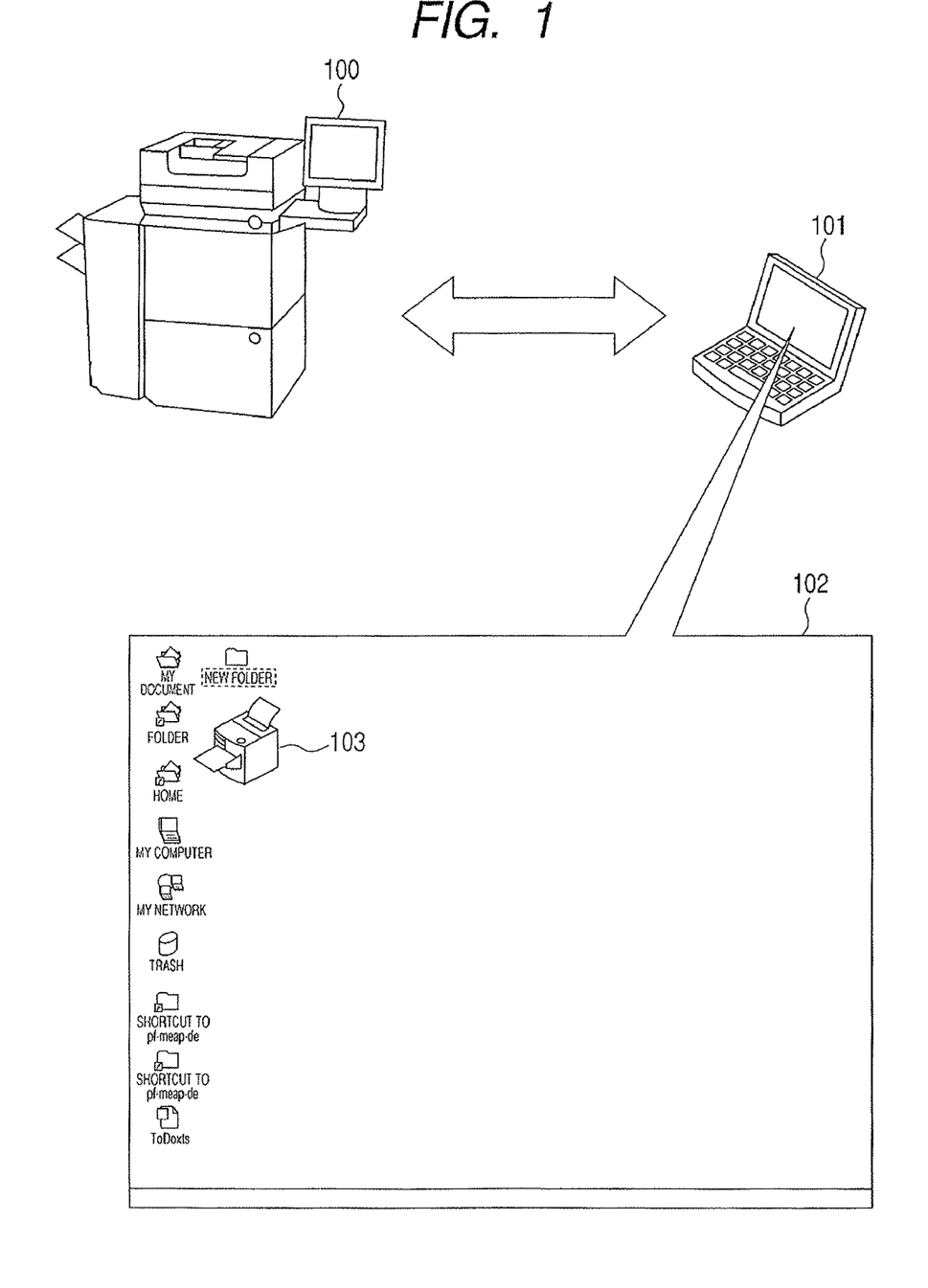
FIG. 1 illustrates an example of the system configuration according to the present embodiment.

FIG. 1 illustrates an example of the system configuration according to the present embodiment. The MFP 100 and the PC 101 can communicate with each other using wireless communication capability. When a function of the MFP 100 is available, a printer icon 103 is displayed on a screen 102 of the PC 101, and the printer icon 103 disappears when the function is unavailable. The function of the MFP 100 is available from the PC 100 by dragging a file to the printer icon 103. The present embodiment is realized by controlling the icon (object) relating to peripheral equipment such as a printer apparatus (printer, MFP) by displaying the icon on a predetermined condition.

Figure 2:
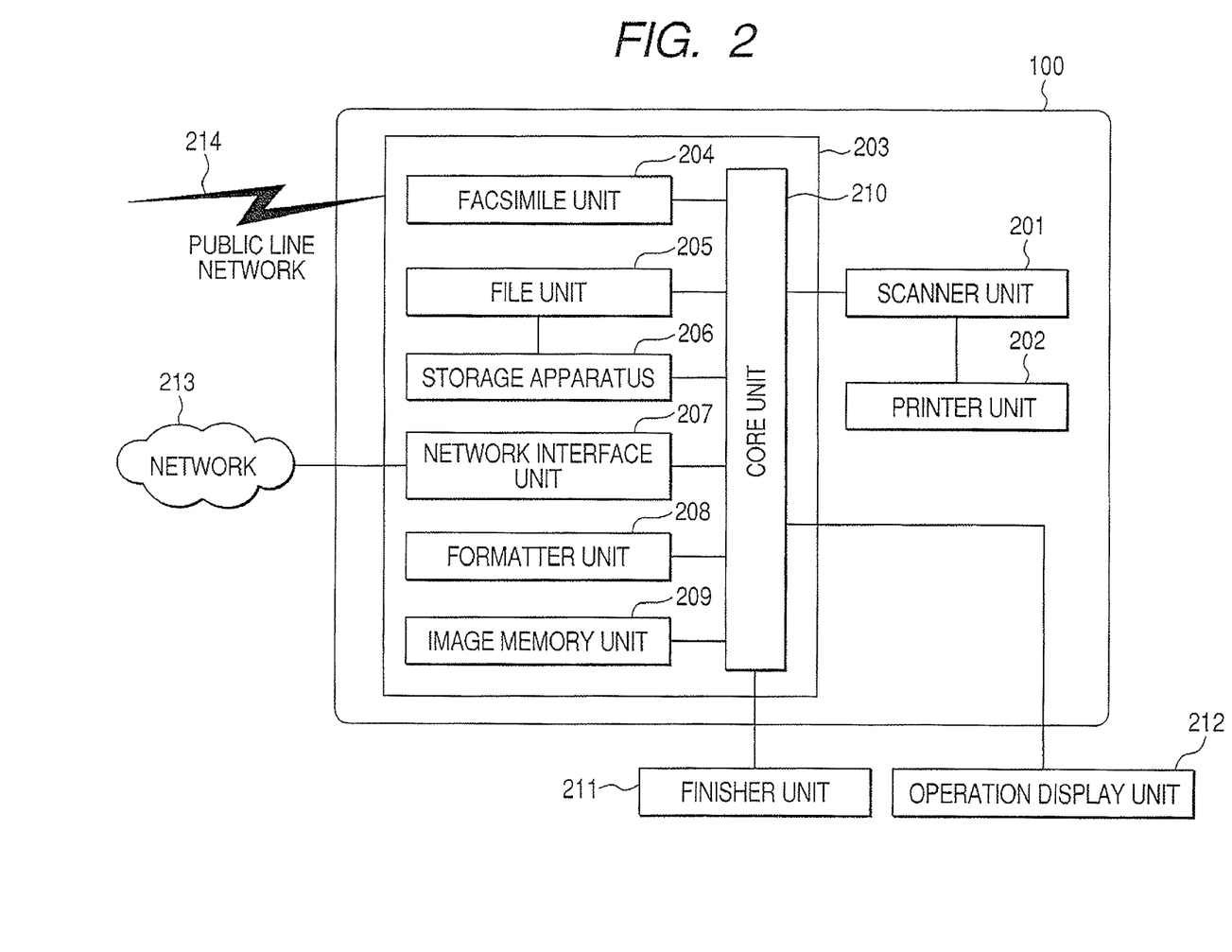
FIG. 2 is a block diagram illustrating an example of the configuration of an MFP 100 according to the present embodiment.

FIG. 2 is a block diagram illustrating an example of the configuration of the MFP 100 according to the present embodiment. The MFP 100 has the functions of a scanner, a printer, a copy machine and a facsimile, and is connected to a network through a network interface unit 207. The MFP 100 can also communicate with other communication apparatuses through a public line network 214.

As shown in FIG. 2, the MFP 100 is mainly configured by a scanner unit 201, a printer unit 202 and a control unit 203.

The scanner unit 201 is connected to the printer unit 202 and the control unit 203, reads an image of an original, and generates the image data of the read image. Furthermore, the scanner unit 201 transmits the image data to the printer unit 202 or the control unit 203. The printer unit 202 prints an image on recording paper based on the image data received from the scanner unit 201 or the control unit 203.

The control unit 203 is connected to an external network 213 and the public line network 214, and can input and output image data through them.

The control unit 203 includes a facsimile unit 204, a file unit 205, a storage apparatus 206, the network interface unit 207, a formatter unit 208, an image memory unit 209 and a core unit 210.

The facsimile unit 204 is connected to the core unit 210 and the public line network 214, decompresses the compressed image data received from the public line network 214, and transmits the decompressed image data to the core unit 210. The facsimile unit 204 compresses the image data transmitted from the core unit 210, and transmits the compressed image data to another device through the public line network 214.

The file unit 205 is connected to the core unit 210 and the storage apparatus 206, compresses the image data transmitted from the core unit 210, and stores the compressed image data and the keyword for retrieval of the compressed image data in the storage apparatus 206. The file unit 205 retrieves the compressed image data stored in the storage apparatus 206 using a keyword transmitted from the core unit 210.

Then, the file unit 205 reads and decompresses the compressed image data found by the retrieval, and transmits the decompressed image data to the core unit 210. The formatter unit 208 is connected to the core unit 210, and develops the data described in the PDL (Page Description Language) into image data that can be processed by the printer unit 202.

The image memory unit 209 temporarily stores the information from the scanner unit 201 and the information transmitted through the network interface unit 213.

The core unit 210 controls data transmitted through the scanner unit 201, the facsimile unit 204, the file unit 205, the network interface unit 207 and the formatter unit 208 as described above. Also, the core unit 210 analyzes job control data, or stores the information such as the number of copied pages, the number of printed pages, the number of scanned pages to manage the usage of a user.

A finisher unit 211 ejects the paper on which the printer unit 202 has printed an image. An operation display unit 212 displays an operation screen for operation of the MFP 100, an input screen for input of information, or an error message indicating an error occurring on the MFP 100. The operation display unit 212 has a key or a button for operation of the composite 100, by which an operation instruction from a user is input.

Figure 3:
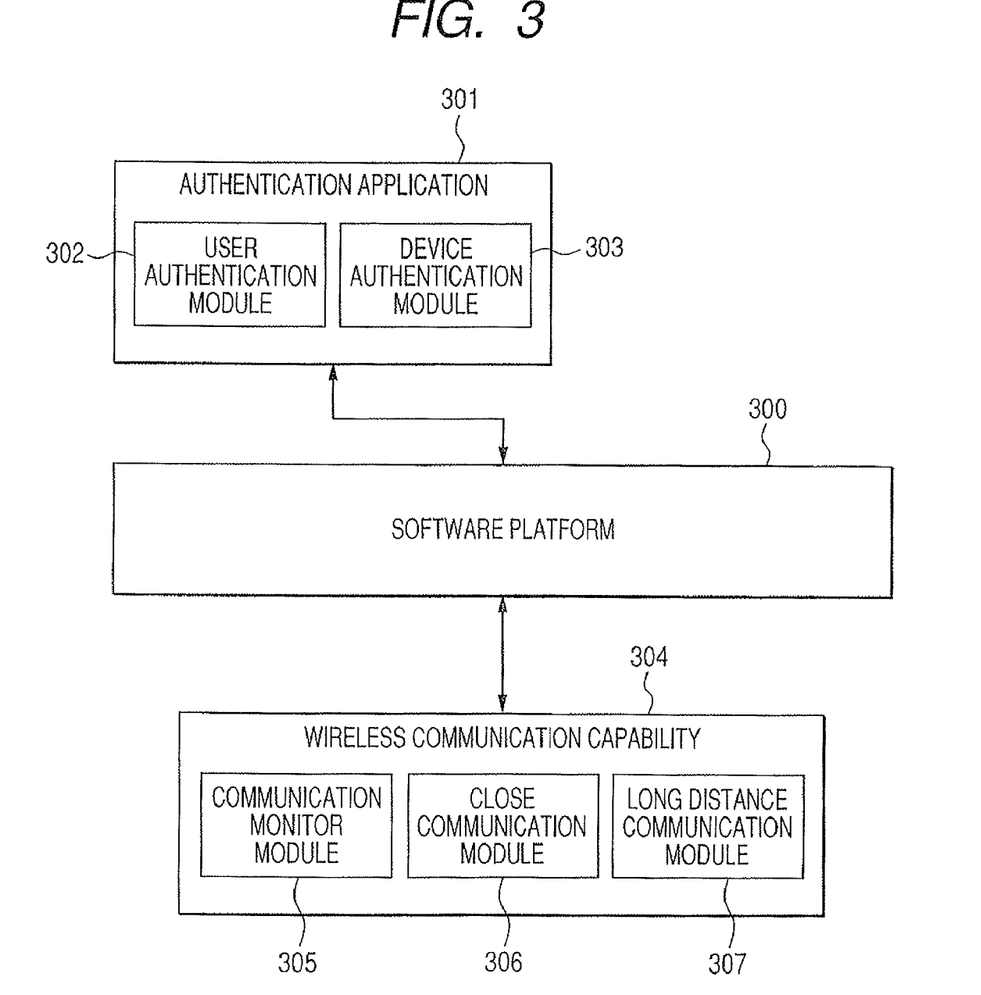
FIG. 3 illustrates an example of the configuration of a software loaded into a core unit 210.

FIG. 3 illustrates an example of the configuration of the software loaded into the core unit 210. A software platform 300 can communicate with an authentication application 301 and a wireless communication capability 304.

The authentication application 301 includes a user authentication module 302 for providing user authenticating capability and a device authentication module 303 for providing a device authenticating capability, and can perform the authenticating processes using the respective modules. The wireless communication capability 304 includes a communication monitor module 305 for providing the function of monitoring communications, a close communication module 306 for providing a close distance wireless communication capability, and a long distance communication module 307 for providing a long distance wireless communication capability. The wireless communication capability 304 can perform wireless communications using each of the modules.

Figure 4:
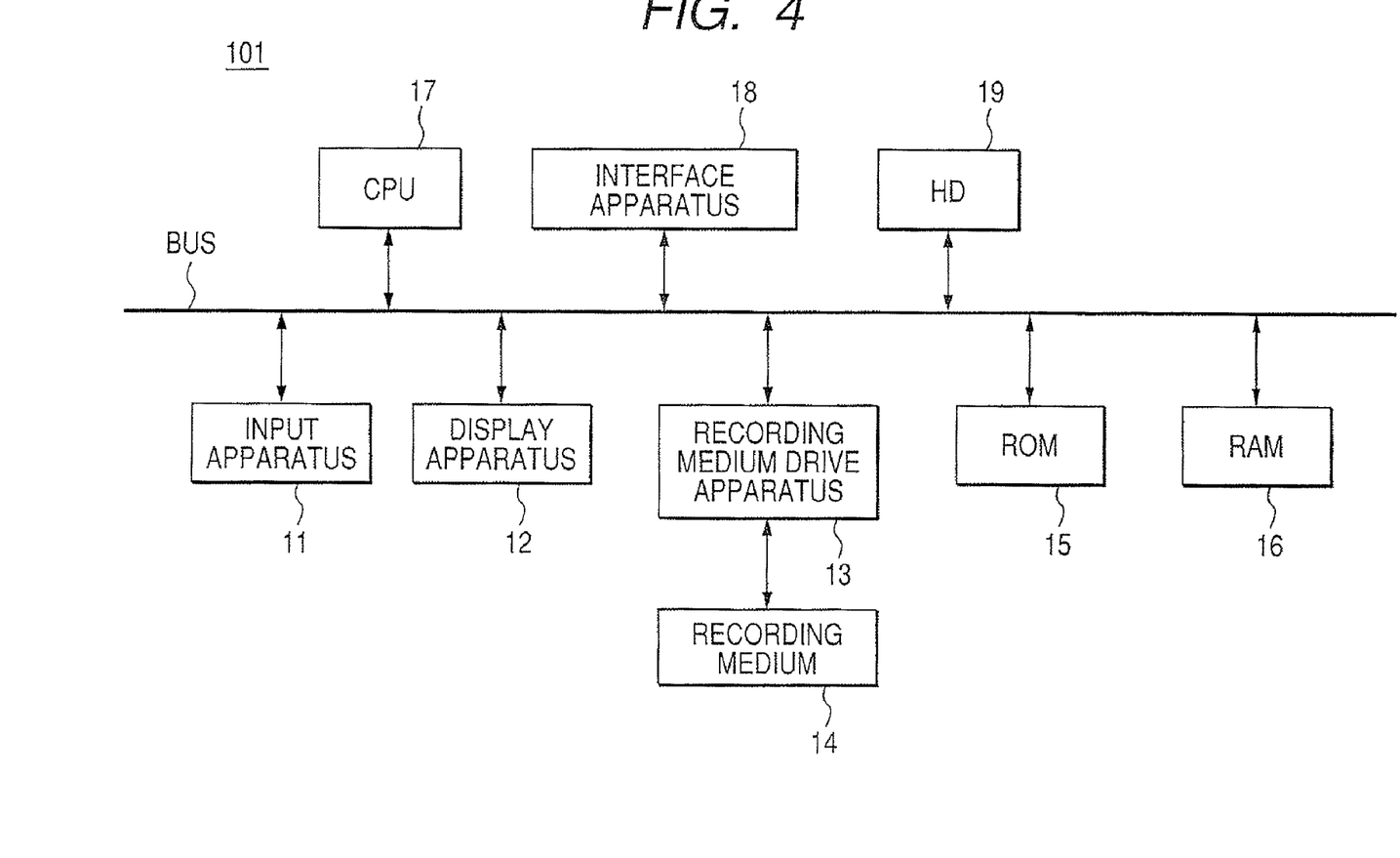
FIG. 4 illustrates an example of the hardware configuration of a PC 101.

FIG. 4 illustrates an example of the hardware configuration of the PC 101. As illustrated in FIG. 4, the PC 101 includes in the hardware configuration, an input apparatus 11, a display apparatus 12, a recording medium drive apparatus 13, ROM 15, RAM 16, a CPU 17, an interface apparatus 18 and HD 19.

The input apparatus 11 is configured by a keyboard, a mouse, etc. operated by an operator of the PC 101, and is used in inputting various operation information in the PC 101. The display apparatus 12 is configured by a display etc. used by an operator of the PC 101, and is used in displaying various information.

The interface apparatus 18 is an interface for connection of the PC 101 to a network etc.

The function of the PC 101 described later or the program relating to a flowchart etc. described later are, for example, provided for the PC 101 by a recording medium 14 such as CD-ROM, or downloaded through a network etc. The recording medium 14 is set in the recording medium drive apparatus 13, and the program is installed from the recording medium 14 in the HD 19 through the recording medium drive apparatus 13.

The ROM 15 records a program etc. first read when the PC 101 is powered up. The RAM 16 is a main memory of the PC 101. The CPU 17 reads a program from the HD 19 as necessary, stores the program in the RAM 16, and executes the program, thereby providing all or a part of the functions described later or executing the flowchart described later. In addition to the program, the HD 19 stores, for example, a file to be printed.

Figure 5:
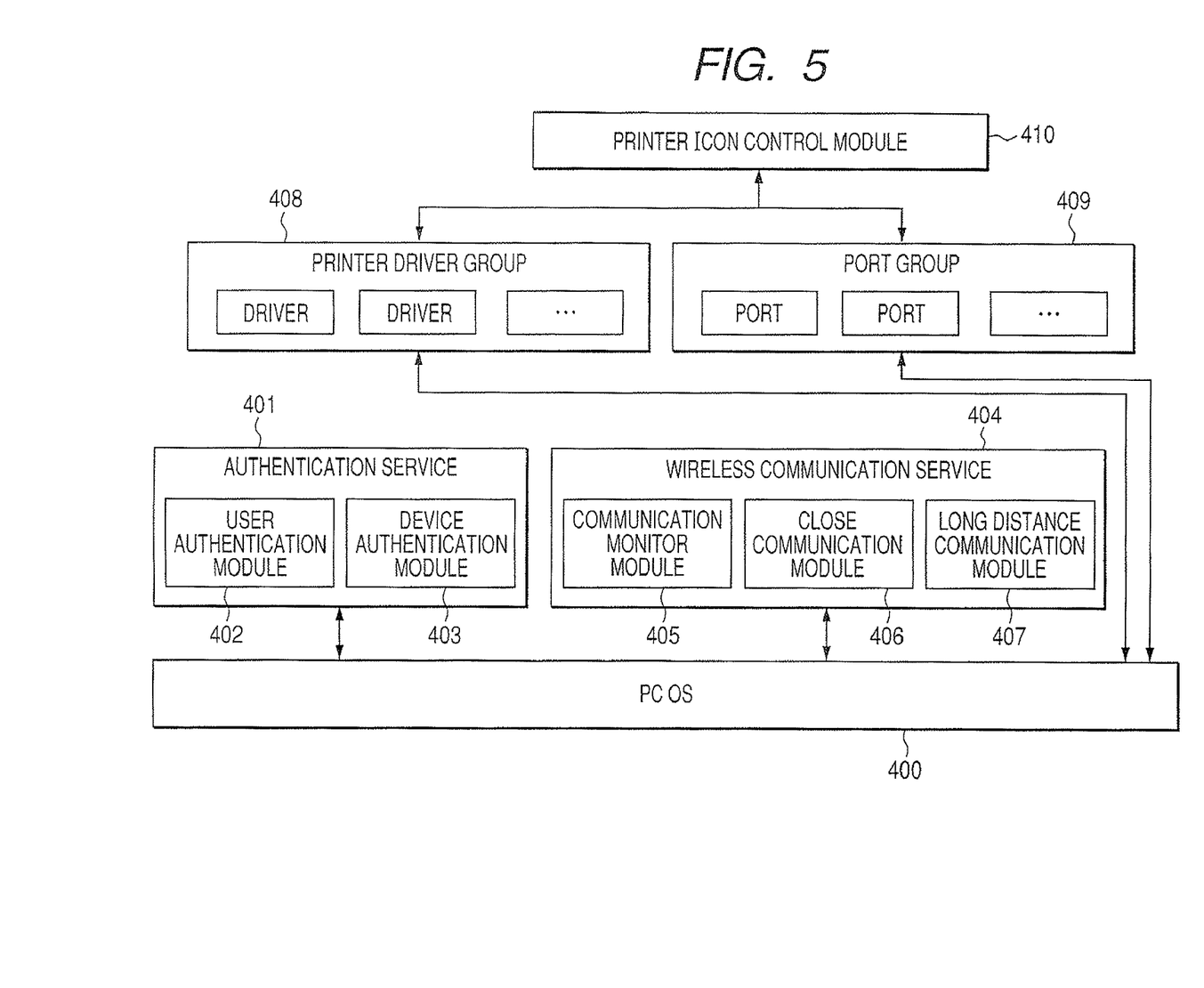
FIG. 5 illustrates an example of the software configuration loaded into the PC 101 according to the present embodiment.

FIG. 5 illustrates the configuration of the software loaded in the PC 101 according to the present embodiment. A PC OS 400 can communicate with an authentication service 401, a wireless communication service 404, a printer driver group 408 and a port group 409.

The authentication service 401 includes a user authentication module 402 for providing a user authentication capability and a device authentication module 403 for providing a device authentication capability, and can perform an authenticating process using each module. The wireless communication service 404 includes a communication monitor module 405 for providing the function of monitoring communications, a close communication module 406 for providing a short distance wireless communication capability, and a long distance communication module 407 for providing a long distance wireless communication capability. The wireless communication service 404 can perform wireless communication using each module.

A printer icon control module 410 can communicate with the printer driver group 408 and the port group 409. The PC 101 performs the process of associating a printer driver and a port respectively selected from the printer driver group 408 and the port group 409 with the printer icon control module 410. The PC 101 also performs the process of releasing the association.

When the process of associating the printer driver and the port is performed, the printer icon control module 410 displays an icon on the display apparatus 12. On the other hand, when the process of releasing the association with the printer driver and the port is performed, the printer icon control module 410 clears the display of the icon on the display apparatus 12.

Figure 6A:
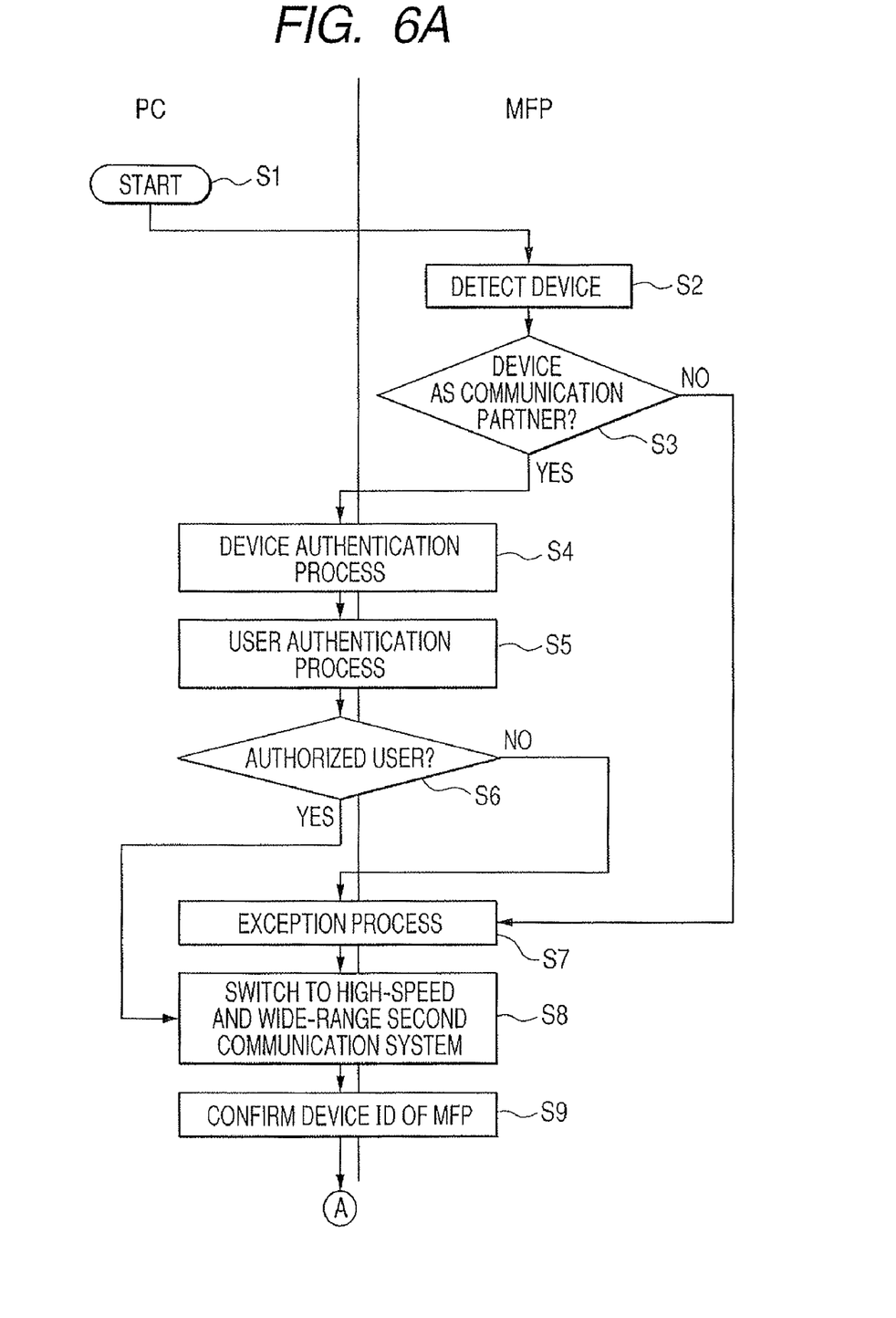
FIG. 6A illustrates a sequence of the processes from a point when the PC 101 and the MFP 100 are close to each other such that a short distance wireless communication can be established to a point in which a printer icon is displayed on the PC 101 and the print processing is performed using the icon.
Figure 6B:
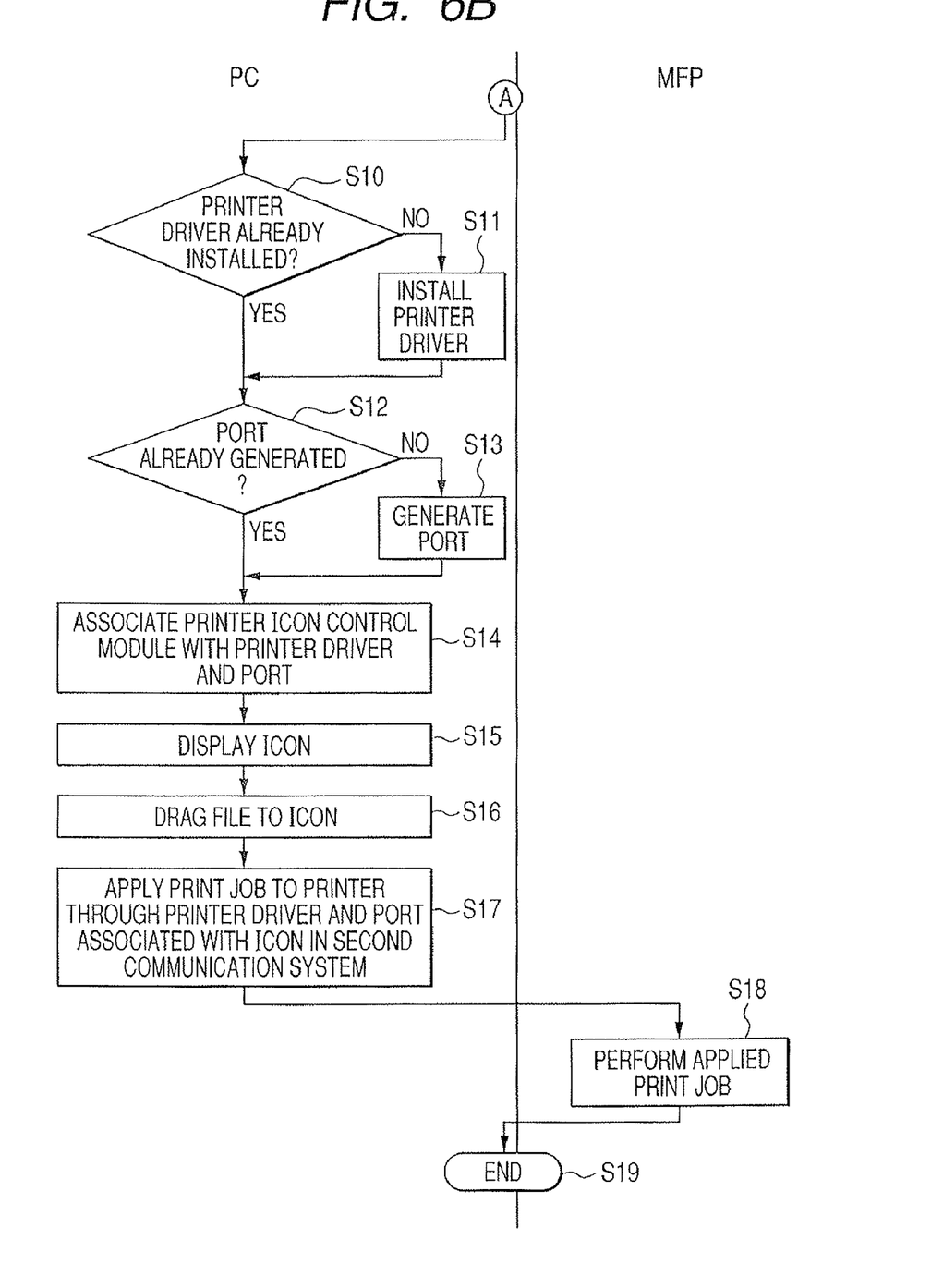
FIG. 6B illustrates a sequence of the processes from a point when the PC 101 and the MFP 100 are close to each other such that a short distance wireless communication can be established to a point in which a printer icon is displayed on the PC 101 and the print processing is performed using the icon.

FIGS. 6A and 6B illustrate the sequence of the process from the point when the PC 101 and the MFP 100 are close to each other such that a short distance wireless communication can be established to the point when a printer icon is displayed on the PC 101 and the print processing can be performed using the icon.

When the PC 101 and the MFP 100 are close to each other such that the short distance wireless communication can be established in step S1, the process illustrated in FIGS. 6A and 6B is started. In step S2, the MFP 100 detects the PC 101 as a device.

Then, in step S3, the MFP 100 determines whether or not the detected PC 101 is a device that can communicate with the MFP 100.

If the MFP 100 determines that the PC 101 can communicate with the MFP 100, then the device authenticating process on the PC 101 itself is performed between the MFP 100 and the PC 101 in step S4. On the other hand, if the MFP 100 determines that the PC 101 cannot communicate with the MFP 100, then the MFP 100 and the PC 101 (or MFP 100) perform an exception process in step S7.

In step S5, a user authenticating process is performed between the MFP 100 and the PC 101.

Based on the result of the authenticating process, the MFP 100 and the PC 101 determine whether or not the user has been authorized.

If the MFP 100 and the PC 101 determine that the user has been authorized, control is passed to step S8. If they determine that the user has not been authorized, control is passed to step S7. In step S7, the MFP 100 and the PC 101 perform an exception process.

In step S8, a switch to a long distance wireless communication system (second communication system) in which the communication speed is faster between the MFP 100 and the PC 101 and the communication range is larger is performed. The first communication system is, for example, a short distance wireless communication system.

Then, in step S9, the process of confirming the device ID of the MFP 100 is performed between the MFP 100 and the PC 101.

In step S10, the PC 101 determines whether or not the printer driver corresponding to the device ID has been installed. If the PC 101 determines that the printer driver corresponding to the device ID has been installed, control is passed to step S12. If the PC 101 determines that the printer driver corresponding to the device ID has not been installed, then control is passed to step S11. In step S11, the PC 101 installs the printer driver corresponding to the device ID. After installing the printer driver, the PC 101 passes control to step S12.

In step S12, the PC 101 determines whether or not a port corresponding to the device ID has been generated. If the PC 101 determines that the port corresponding to the device ID has been generated, then control is passed to step S14. If the PC 101 determines that the port corresponding to the device ID has not been generated, then control is passed to step S13. In step S13, the PC 101 generates a port corresponding to the device ID. After generating a port, the PC 101 passes control to step S14.

In step S14, the PC 101 associates the printer icon control module 410 with a printer driver and a port. Then, in step S15, the printer icon control module 410 associated with the printer driver and the port performs a displaying process of displaying an icon on the UI screen of the display apparatus 12.

The printer icon is an example of an object. The MFP 100 is an example of a peripheral equipment unit. The PC 101 is an example of a portable communication apparatus. The software component includes a printer driver for the PC 101 to control the MFP 100 and to generate print data.

Then, in step S16, the PC 101 drags a file to a displayed icon depending on the user operation. Then, in step S17, the PC 101 converts a file dragged to the icon to a printer job using the printer driver and the port associated with the printer icon control module 410, and applies the job to the MFP 100 in the second communication system. In this case, an example of the association between the icon and the printer icon control module 410 and the printer driver and the port can be a method of, for example, dragging a file to an icon as a hot folder and transferring the data to a printer driver, converting the data into a print job by the printer driver, and transmitting the converted data through a port. The set port is a destination corresponding to a printer connected over a network.

In step S18, the MFP 100 performs an applied print job. In step S19, the PC 101 and the MFP 100 terminate the process illustrated in FIGS. 6A and 6B.

By performing the process illustrated in FIGS. 6A and 6B, one printer icon relating to the printer icon control module 410 associated with the printer driver and the port is displayed on the PC 101. Thus, the user can perform the print processing using the icon.

Figure 7:
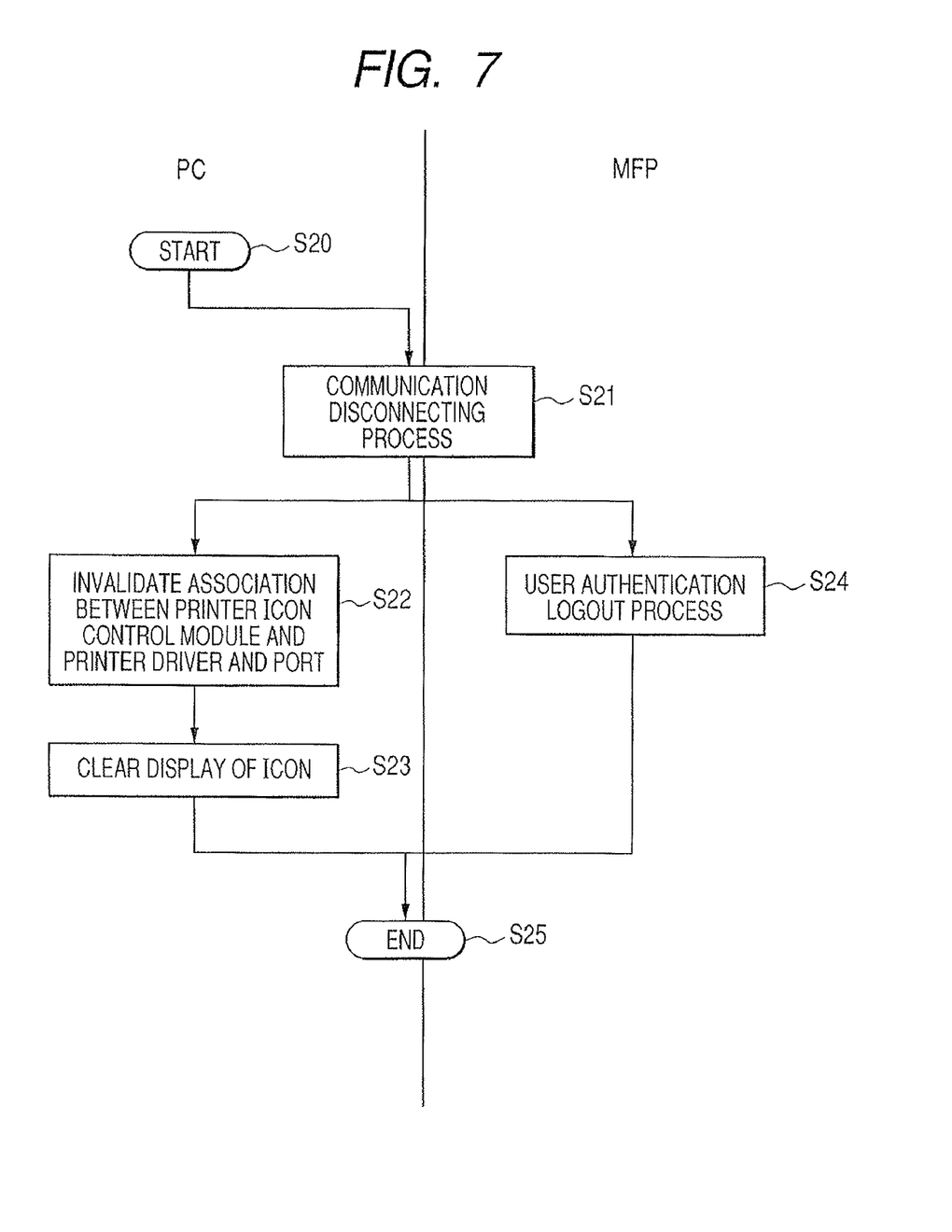
FIG. 7 illustrates a sequence of the processes from a communication disconnection to a point when the printer icon displayed on the PC 101 disappears when the PC 101 and the MFP 100 cannot establish a wireless communication because they are not close enough to each other to establish communication.

FIG. 7 illustrates a sequence of the process performed from a communication disconnection to a point when the printer icon displayed on the PC 101 disappears when the PC 101 and the MFP 100 cannot establish a wireless communication because they are not close enough to each other to establish communications.

In step S20, when the PC 101 is so separate from the MFP 100 that the wireless communication cannot be established, the process illustrated in FIG. 7 is started. In step S21, the PC 101 and the MFP 100 perform a communication disconnecting process, and the PC 101 passes control to step S22 and the MFP 100 passes control to step S24.

In step S22, the PC 101 performs the process of invalidating the association between the printer icon control module 410 and a printer driver and a port. Then, in step S23, the printer icon control module 410 of the PC 101 performs the process of clearing the display of a displayed icon because the association with the printer driver and the port is released. The PC 101 passes control to step S25 and terminates the process illustrated in FIG. 7.

In step S24, the user authentication module 302 of the MFP 100 performs a logout process. Then, the MFP 100 passes control to step S25, and terminates the process illustrated in FIG. 7.

By performing the process illustrated in FIG. 7, the communication can be disconnected and the process of clearing the display of the printer icon on the PC 101 can be performed when the PC 101 and the MFP 100 are so separate that the wireless communication cannot be established.

FIG. 7 illustrates the processes of disconnecting the communication and clearing the display of the printer icon on the PC 101 when the PC 101 are so separate from the 100 that the wireless communication cannot be established. However, for example, when a user clicks the right button of the mouse on the printer icon of the PC 101, and the PC 101 detects that the disconnection is selected from the property etc., the disconnection of the communication and the process of clearing the display of the printer icon on the PC 101 can be performed.

Next, the second embodiment of the present invention is described below with reference to the attached drawings.

Figure 8A:
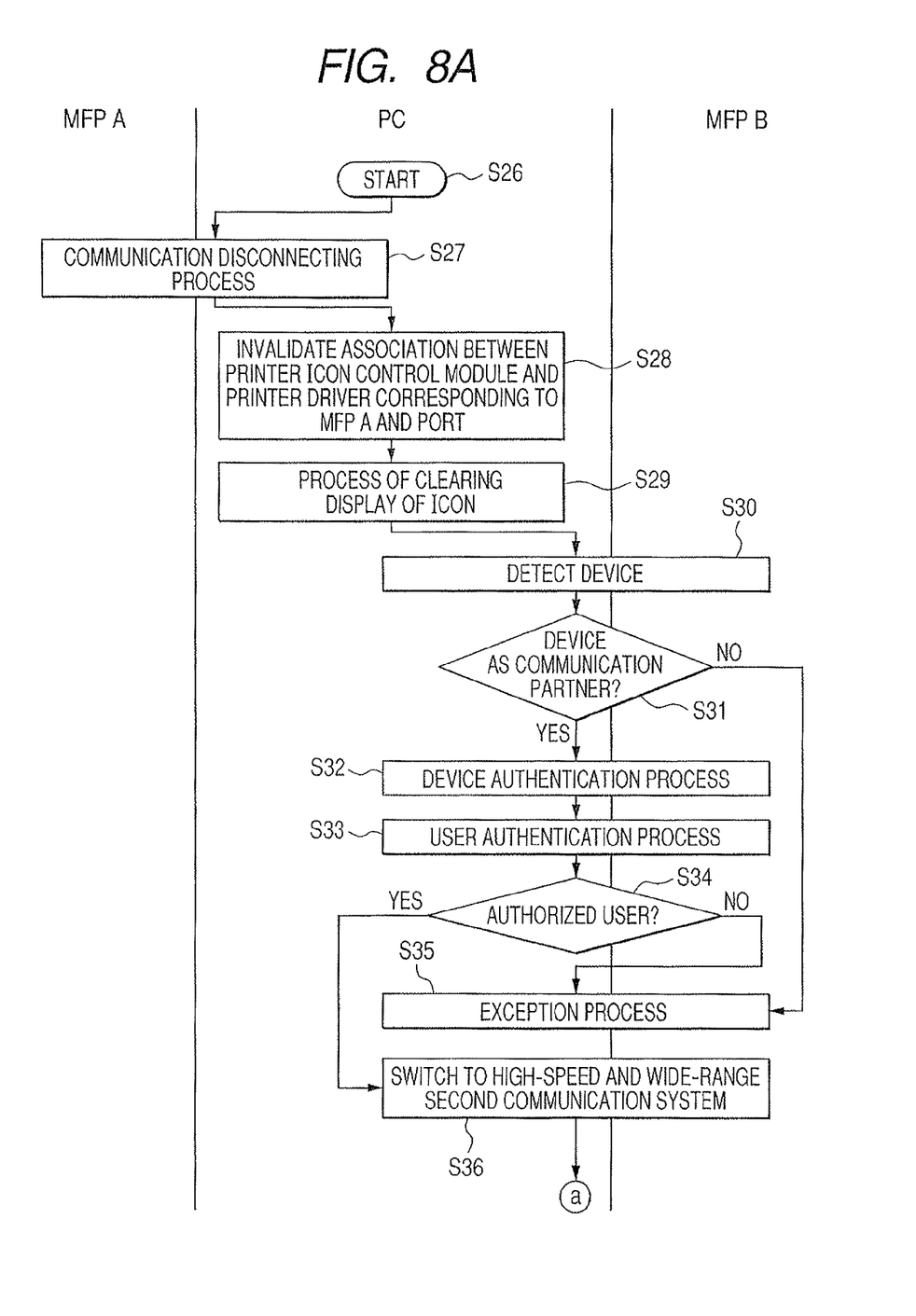
FIGS. 8A and 8B illustrate sequences of the processes from a point when a printer icon for an MFP A is not displayed to a point when a printer icon for an MFP B is displayed on the PC 101.
Figure 8B:
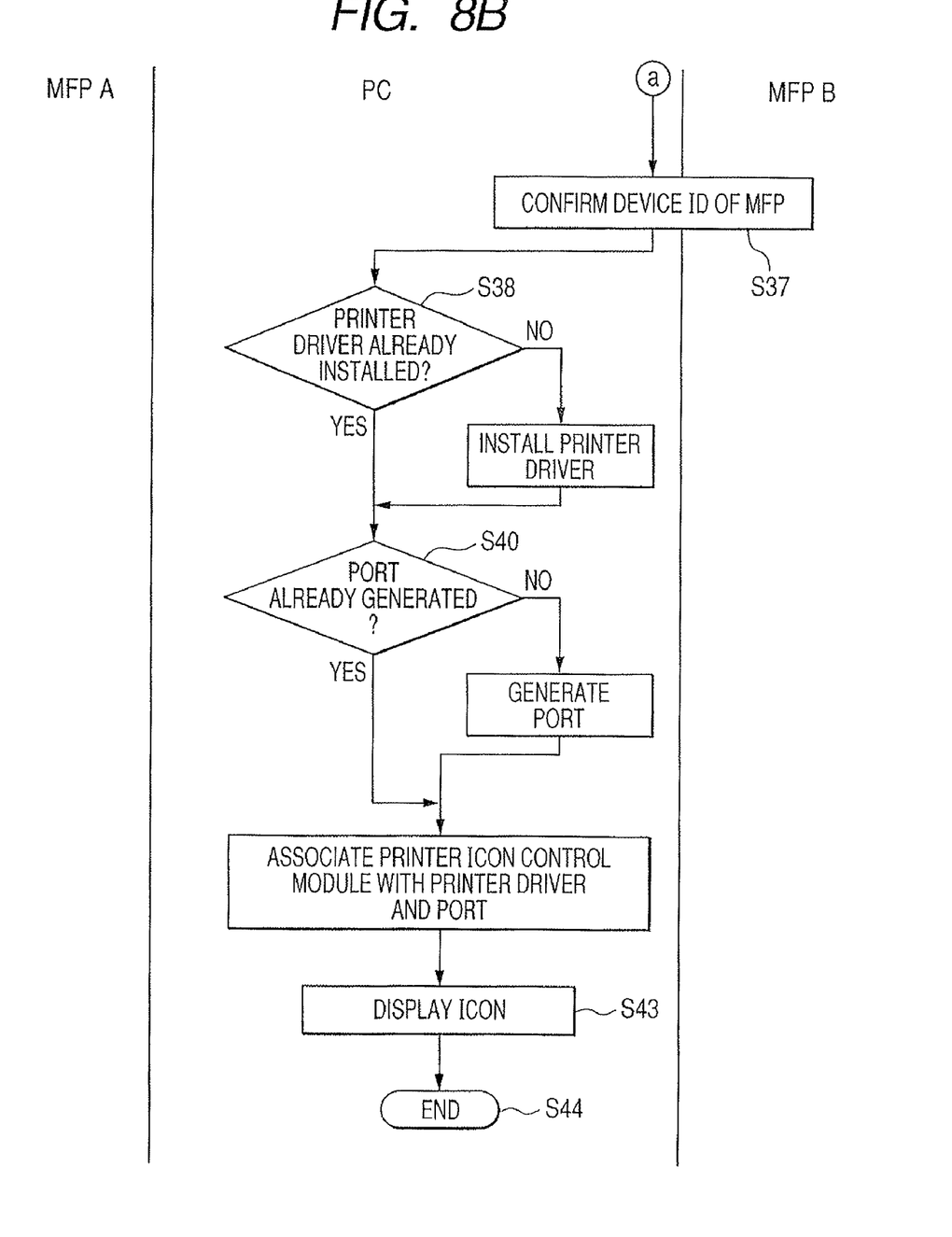

FIGS. 8A and 8B illustrate sequences of the processes until the association between the MFP A and the printer icon is disconnected and the icon is cleared on the display, and the association between the MFP B and the printer icon and the printer icon is displayed again on the PC 101.

In step S26, the process illustrated in FIG. 8 is started when the PC 101 is close to the MFP B within a distance at which the short distance wireless communication can be established with the printer icon of the MFP A displayed on the PC 101.

In step S27, the PC 101 and the MFP A perform the communication disconnecting process, and the PC passes control to step S28.

In step S28, the PC performs the process of invalidating the association between the printer icon control module 410 and the printer driver and the port. Then, in step S29, since the association with the printer driver and the port has been released, the printer icon control module 410 of the PC performs the process of clearing the display of the displayed icon, and control is passed to step S30. In step S30, when the PC is so close to the MFP 100 that the short distance wireless communication can be established, the MFP B detects the PC as a device. In step S31, the MFP B determines whether or not the detected PC is a device with which the MFP B can communicate.

If the MFP B determines that the PC is a device with which the MFP B can communicate, the device authenticating process is performed on the PC between the MFP B and the PC in step S32. On the other hand, if the MFP B determines that the PC is not a device with which the MFP B can communicate, then the MFP B and the PC performs the exception process in step S34. Then, in step S33, a user authenticating process is performed between the MFP B and the PC.

Next, based on the result of the authenticating process in step S34, the MFP B and the PC determines whether or not the user is authorized.

If the MFP B and the PC determine that the user is authorized, then control is passed to step S36. If they determine that the user is not authorized, control is passed to step S37. In step S37, the MFP B and the PC perform the exception process.

In step S36, a switch to a long distance wireless communication system (second communication system) in which the communication speed is faster between the MFP B and the PC and the communication range is larger is performed. The first communication system is, for example, a short distance wireless communication system.

Then, in step S37, the process of confirming the device ID of the MFP B is performed between the MFP B and the PC.

In step S38, the PC determines whether or not the printer driver corresponding to the device ID has been installed. If the PC determines that the printer driver corresponding to the device ID has been installed, control is passed to step S40. If the PC determines that the printer driver corresponding to the device ID has not been installed, then control is passed to step S39. In step S39, the PC installs the printer driver corresponding to the device ID. After installing the printer driver, the PC passes control to step S40.

In step S40, the PC determines whether or not a port corresponding to the device ID has been generated. If the PC determines that the port corresponding to the device ID has been generated, then control is passed to step S42. If the PC determines that the port corresponding to the device ID has not been generated, then control is passed to step S41. In step S41, the PC generates a port corresponding to the device ID. After generating a port, the PC passes control to step S42.

In step S42, the PC associates the printer icon control module 410 with a printer driver and a port. Then, in step S43, the printer icon control module 410 associated with the printer driver and the port performs a displaying process of displaying an icon on the UI screen of the display apparatus 12.

By performing the process illustrated in FIG. 8, the association between the printer driver of the MFP A and the network port and the printer icon is disconnected, and the icon is cleared from the display. Then, the printer driver of the MFP B and the network port are associated with the printer icon, and the printer icon is displayed again on the PC 101.

Thus, between the MFP A and the MFP B, the printer icon displayed on the PC is constantly the same although the printer drivers are different, and even when the printer drivers are different, the same icon can be displayed. The printer icon displayed on the PC can be processed for various printers to be connected as a common icon for a plurality of printer drivers held in the PC.

Thus, the user can easily understand that the printer icon displayed on the PC is the currently communicating printer, and can be free of confirming connected printers and considering on which printer the printing process is to be performed. In addition, the name of the icon can be displayed using a common name such as a "printer being connected".

Additionally, the user can set a different print setting on each printer. For example, a staple setting and a two-sided setting can be made for one printer, and printing as a book can be set as a default setting for another printer. Then, setting can be executed only by dragging and dropping a file to the icon displayed on the screen. Thus, a user can easily perform the printing process with the printing settings corresponding to the capability of a printer without high attention to the printer currently being connected.

In the present embodiment, the MFP 100 is described as an information equipment unit that can communicate with the PC 101 by wireless. However, the present embodiment is not limited to this application. For example, the unit can be a digital copying machine, a printer having a copying function, a facsimile, a printer, a scanner apparatus, etc.

In the present embodiment, the PC 101 is described as an information equipment unit that can communicate with the MFP 100 by wireless. However, the present embodiment is not limited to this application. For example, the unit can be a PDA (personal digital assistant) etc.

In addition, in the present embodiment, the process of clearing the display of the icon on the PC 101 is performed when the printer driver associated with the printer icon is changed. However, an associated printer driver can be changed with the printer icon displayed. When there is no printer driver associated with the displayed printer icon, a notification of the information can be transmitted to a user, or if the status continues for a predetermined period, the display of the icon can be automatically deleted.

As described above, according to the present embodiment, the convenience of a user can be improved when an information equipment unit, with which a wireless communication can be established, is used.

(Other Embodiments)

It is obvious that the objects of the present invention can be attained by the following applications. That is, a recording medium (or a storage medium) storing a program code of a software for realizing the functions of the above-mentioned embodiments is supplied to a system or an apparatus. Then, the computer (or CPU, MPU, etc.) of the system or the apparatus reads the program code stored on the recording medium. In this case, the program code read from the recording medium realizes the functions of the above-mentioned embodiments, and the recording medium storing the program code configures the present invention.

In addition, by executing the program code read by the computer, the operating system (OS) etc. operating on the computer performs a part or all of the actual processes at an instruction of the program code. It is obvious that realizing the functions of the above-mentioned embodiments by the processes is included.

Furthermore, assume that the program code read from a recording medium is written to the memory in a feature expansion card inserted into the computer or in a feature expansion unit connected to the computer. Then, at an instruction of the program code, the CPU etc. of the feature expansion card and the feature expansion unit can perform a part or all of the actual processes, and the functions of the above-mentioned embodiments can be realized by the processes, which is also obviously included in the present invention.

When the present invention is applied to the above-mentioned recording medium, the recording medium stores the program code corresponding to the above-mentioned flowchart.

The embodiments of the present invention are described above, but the present invention is not limited to the specific embodiments, but various variations and modifications can be made within the gist of the present invention as described in the claims for the patent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-201858, filed Jul. 25, 2006, No. 2007-133338 which is May 18, 2007 hereby incorporated by reference herein in their entirety.

What is claimed is:

1. An information processing apparatus, comprising:
a determination unit constructed to determine, when a communication is established between the information processing apparatus and a printer apparatus, whether or not a user of the information processing apparatus is authorized to use the printer apparatus, wherein the printer apparatus is detected using a first communication system based on a short distance wireless communication and the communication is established using a second communication system based on a wireless communication for sending a job from the information processing apparatus to the printer apparatus;
an installation unit constructed to install, when the communication is established between the information processing apparatus and the printer apparatus, a specific printer driver corresponding to the printer apparatus, if the specific printer driver has not been installed in the information processing apparatus;
an associating unit constructed to associate an object with the specific printer driver and a network port relating to the communication between the information processing apparatus and the printer apparatus when the determination unit determines that the user of the information processing apparatus is authorized to use the printer apparatus, and to release the association between the object and the specific printer driver and the network port when the communication between the information processing apparatus and the printer apparatus is not established;
an object control unit constructed to control displaying of an object indicating the printer apparatus,
wherein when the information processing apparatus communicates with a plurality of printer apparatuses, the object control unit controls displaying such that a plurality of objects indicating the respective printer apparatuses are represented by a same object on a display apparatus, wherein the same object is provided with a name indicating that a communication is established between the information processing apparatus and the printer apparatus, and wherein even if (a) the installation unit installs a respective printer driver corresponding to the different one of the plurality of printer apparatuses when communication is established between the information processing apparatus and the corresponding printer apparatus, and (b) the associating unit associates each of the plurality of objects with the installed respective printer driver and a network port relating to a communication between the information processing apparatus and the corresponding printer apparatus, the object control unit controls displaying such that the same object can be commonly used by the plurality of installed printer drivers, and wherein the object control unit controls displaying of the object when authentication of the printer apparatus detected using the first communication system is successful and the communication is established between the information processing apparatus and the detected printer apparatus using the second communication system;
a non-transitory computer-readable memory constructed to store computer-executable process steps; and
a processor constructed to function as at least one of the units by executing the computer-executable process steps stored in the memory.

2. The information processing apparatus according to claim 1, wherein a printer driver corresponding to a first printer apparatus and a printer driver corresponding to a second printer apparatus different from the first printer apparatus are retained.

3. The information processing apparatus according to claim 1, further comprising a job applying unit constructed to apply a job relating to a file to the printer apparatus corresponding to the specific printer driver and the network port through the specific printer driver and the port associated with the object, when the file is dragged and dropped on the object displayed on the display apparatus.

4. The information processing apparatus according to claim 1, wherein when the communication is not established with the printer apparatus, the associating unit releases the association between the object and the specific printer driver corresponding to the printer apparatus and the network port relating to the communication with the printer apparatus, and wherein the object control unit clears display of the object corresponding to the printer apparatus and displayed on the display apparatus based on the release of the association by the associating unit.

5. The information processing apparatus according to claim 1, wherein the printer apparatus has a wireless communication capability.

6. An information processing method for use with an information processing apparatus comprising a non-transitory computer-readable memory constructed to store computer-executable process steps, and a processor constructed to execute the computer-executable process steps to perform the method, the method comprising:
a determination step configured to determine, when a communication is established between the information processing apparatus and a printer apparatus, whether or not a user of the information processing apparatus is authorized to use the printer apparatus, wherein the printer apparatus is detected using a first communication system based on a short distance wireless communication and the communication is established using a second communication system based on a wireless communication for sending a job from the information processing apparatus to the printer apparatus;
an installation step configured to install, when the communication is established between the information processing apparatus and the printer apparatus, a specific printer driver corresponding to the printer apparatus, if the specific printer driver has not been installed in the information processing apparatus;

an associating step of associating an object with the specific printer driver and a network port relating to the communication between the information processing apparatus and the printer apparatus when the determination step determines that the user of the information processing apparatus is authorized to use the printer apparatus, and of releasing the association between the object and the specific printer driver and the network port when the communication between the information processing apparatus and the printer apparatus is not established; and an object control step of controlling displaying of an object indicating the printer apparatus, wherein when the information processing apparatus communicates with a plurality of printer apparatuses, the object control step controls displaying such that a plurality of objects indicating the respective printer apparatuses are represented by a same object on a display apparatus, wherein the same object is provided with a name indicating that a communication is established between the information processing apparatus and the printer apparatus, and wherein even if (a) the installation step installs a respective printer driver corresponding to a different one of the plurality of printer apparatuses when the communication is established between the information processing apparatus and the corresponding printer apparatus, and (b) the associating step associates each of the plurality of objects with the installed respective printer driver and a network port relating to a communication between the information processing apparatus and the corresponding printer apparatus, the object control step controls displaying such that the same object can be commonly used by the plurality of installed printer drivers, and wherein the object control step controls displaying of the object when authentication of the printer apparatus detected using the first communication system is successful and the communication is established between the information processing apparatus and the detected printer apparatus using the second communication system.

7. The information processing method according to claim 6, further comprising applying a job relating to a file to the printer apparatus corresponding to the specific printer driver and the network port through the specific printer driver and the port associated with the object, when the file is dragged and dropped on the object displayed on the display apparatus.

8. The information processing method according to claim 6, wherein when the communication is not established with the printer apparatus, the associating step releases the association between the object and the specific printer driver corresponding to the printer apparatus and the network port relating to the communication with the printer apparatus, and wherein the control performing step clears display of the object corresponding to the printer apparatus and displayed on the display apparatus based on the release of the association.

9. A non-transitory computer-readable storage medium storing a program for causing a computer to execute an information processing method for use with an information processing apparatus, the information processing method comprising:

determining, when a communication is established between the information processing apparatus and a printer apparatus, whether or not a user of the information processing apparatus is authorized to use the printer apparatus, wherein the printer apparatus is detected using a first communication system based on a short distance wireless communication and the communication is established using a second communication system based on a wireless communication for sending a job from the information processing apparatus to the printer apparatus;

installing, when the communication is established between the information processing apparatus and the printer apparatus, a specific printer driver corresponding to the printer apparatus, if the specific printer driver has not been installed in the information processing apparatus;

associating an object with the specific printer driver and a network port relating to the communication between the information processing apparatus and the printer apparatus when the determination step determines that the user of the information processing apparatus is authorized to use the printer apparatus, and of releasing the association between the object and the specific printer driver and the network port when the communication between the information processing apparatus and the printer apparatus is not established; and controlling displaying of an object indicating the printer apparatus, wherein when the information processing apparatus communicates with a plurality of printer apparatuses, the object control step controls displaying such that a plurality of objects indicating the respective printer apparatuses are represented by a same object on a display apparatus, wherein the same object is provided with a name indicating that a communication is established between the information processing apparatus and the printer apparatus, and wherein even if (a) the installation step installs a respective printer driver corresponding to a different one of the plurality of printer apparatuses when the communication is established between the information processing apparatus and the corresponding printer apparatus, and (b) the associating step associates each of the plurality of objects with the installed respective printer driver and a network port relating to a communication between the information processing apparatus and the corresponding printer apparatus, the object control step controls displaying such that the same object can be commonly used by the plurality of installed printer drivers, and wherein the object controlling step controls the displaying of the object when authentication of the printer apparatus detected using the first communication system is successful and the communication is established between the information processing apparatus and the detected printer apparatus using the second communication system.

* * * * *